US009096957B2

(12) United States Patent
Tada et al.

(10) Patent No.: US 9,096,957 B2
(45) Date of Patent: *Aug. 4, 2015

(54) VINYLIDENE FLUORIDE RESIN POROUS MEMBRANE, MANUFACTURING METHOD THEREFOR, AND METHOD FOR MANUFACTURING FILTRATE WATER (75) Inventors: Yasuhiro Tada, Tokyo (JP); Takeo Takahashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 856 days.

This patent is subject to a terminal disclaimer.

(21) Appl. No.: 13/382,199

(22) PCT Filed: Jul. 8, 2010

(86) PCT No.: PCT/JP2010/061630
§ 371 (c)(1),
(2), (4) Date: Jan. 4, 2012

(87) PCT Pub. No.: WO2011/007714
PCT Pub. Date: Jan. 20, 2011

(65) Prior Publication Data
US 2012/0103895 A1 May 3, 2012

(30) Foreign Application Priority Data

Jul. 14, 2009 (JP) ................................. 2009-165360

(51) Int. Cl.
*B01D 69/08* (2006.01)
*B01D 71/34* (2006.01)
(Continued)

(52) U.S. Cl.
CPC ............... *D01F 6/48* (2013.01); *B01D 67/002* (2013.01); *B01D 69/08* (2013.01); *B01D 69/087* (2013.01);
(Continued)

(58) Field of Classification Search
None
See application file for complete search history.

(56) References Cited

U.S. PATENT DOCUMENTS 4,867,881 A * 9/1989 Kinzer ........................... 210/490
4,990,294 A * 2/1991 Yen et al. ....................... 264/41
(Continued)

FOREIGN PATENT DOCUMENTS

CN 1213339 4/1999
JP 60-216804 10/1985
(Continued)

OTHER PUBLICATIONS

International Search Report issued Sep. 7, 2010 in International (PCT) Application No. PCT/JP2010/061630, of which the present application is the national stage.
(Continued)

*Primary Examiner* — Krishnan S Menon
(74) *Attorney, Agent, or Firm* — Wenderoth, Lind & Ponack, L.L.P.

(57) ABSTRACT

A porous membrane of vinylidene fluoride resin, including a 10 μm-thick portion contiguous to one surface thereof which comprises network resin fibers having an average diameter of at most 100 nm and shows a porosity A1 of at least 60% as measured by a focused ion beam-scanning electron microscope, and showing a surface pore size of at most 0.3 μm on said one surface thereof. The porous membrane has a treated water side surface layer showing a small surface pore size suitable for water filtration treatment and formed of extremely thin network resin fibers giving an extremely high porosity, thus showing an excellent minute particle-blocking performance and also extremely good anti-soiling resistance and regeneratability. The porous membrane is produced by a process including: melt-extrusion of a composition obtained by adding to vinylidene fluoride resin of a large molecular weight a relatively large amount of a polyester plasticizer which is mutually soluble with the resin and provides the resultant mixture with a crystallization temperature that is substantially identical to that of the vinylidene fluoride resin alone to form film, followed by cooling from one side of the film to solidify the film, extracting the plasticizer and stretching the membrane after the extraction while partially wetting a surface portion thereof.

10 Claims, 4 Drawing Sheets (51) Int. Cl.
  *D01F 6/48*   (2006.01)
  *B01D 67/00*  (2006.01)
  *C02F 1/44*   (2006.01)
  *D01D 5/24*   (2006.01)
  *D01F 1/10*   (2006.01)
  *C02F 3/12*   (2006.01)

(52) U.S. Cl.
  CPC ............... *B01D 71/34* (2013.01); *C02F 1/444* (2013.01); *D01D 5/24* (2013.01); *D01F 1/10* (2013.01); *B01D 2325/02* (2013.01); *C02F 3/1268* (2013.01)

(56) References Cited

U.S. PATENT DOCUMENTS

| | | | |
|---|---|---|---|
| 2003/0107150 | A1 | 6/2003 | Hamanaka et al. |
| 2004/0135274 | A1* | 7/2004 | Matsuda et al. ............ 264/28 |
| 2007/0039872 | A1* | 2/2007 | Tada et al. ............ 210/500.23 |
| 2007/0215540 | A1 | 9/2007 | Tada et al. |
| 2008/0156722 | A1 | 7/2008 | Suzuki et al. |
| 2009/0206035 | A1 | 8/2009 | Takahashi et al. |

FOREIGN PATENT DOCUMENTS

| | | |
|---|---|---|
| JP | 63-296939 | 12/1988 |
| JP | 63-296940 | 12/1988 |
| JP | 3-215535 | 9/1991 |
| JP | 7-173323 | 7/1995 |
| JP | 2007-313491 | 12/2007 |
| JP | 2008-36635 | 2/2008 |
| WO | 99/47593 | 9/1999 |
| WO | 01/28667 | 4/2001 |
| WO | 02/70115 | 9/2002 |
| WO | 2005/099879 | 10/2005 |
| WO | 2005/123234 | 12/2005 |
| WO | 2006/087963 | 8/2006 |
| WO | 2007/010832 | 1/2007 |
| WO | 2008/117740 | 10/2008 |
| WO | 2010/082437 | 7/2010 |

OTHER PUBLICATIONS

International Preliminary Report on Patentability issued Feb. 7, 2012 in International Application No. PCT/JP2010/061630, of which the present application is the national stage.

* cited by examiner

VINYLIDENE FLUORIDE RESIN POROUS MEMBRANE, MANUFACTURING METHOD THEREFOR, AND METHOD FOR MANUFACTURING FILTRATE WATER

TECHNICAL FIELD

The present invention relates to a porous membrane made of a vinylidene fluoride resin, which is suitable as a membrane for separation and particularly excellent in anti-soiling characteristic and regeneratability in addition to water (filtration) treatment performance, a process for production thereof, and a process for producing filtrate water using the same.

BACKGROUND ART

Vinylidene fluoride resin is excellent in chemical resistance, heat resistance and mechanical strength and, therefore, has been studied with respect to application thereof to porous membranes for separation. Many proposals have been made regarding porous membranes of vinylidene fluoride resin, for water (filtration) treatment, particularly for production of potable water or sewage treatment, and also processes for production thereof (e.g., Patent documents 1-6 listed below).

For example, Patent documents 1 and 2 disclose process for producing porous membrane by the non-solvent-inducing phase separation method wherein a vinylidene-fluoride-resin solution is caused to contact a liquid which solidifies a vinylidene-fluoride-resin solution (generally a non-solvent for a vinylidene fluoride resin), to be solidified. However, according to this process, the diffusion (mass transfer) though a membrane of the non-solvent becomes slow and tends to result in a film on the membrane surface, thus resulting in a porous membrane with a high resin concentration (that is, a low porosity) on the treated water-side surface. On the other hand, Patent document 3 discloses a process of forming a porous membrane, wherein a relatively large amount of an organic liquid of non-mutual solubility with a vinylidene fluoride resin, such as dioctyl phthalate and dibutyl phthalate, is dispersed together with silica powder, in the vinylidene fluoride resin, and these organic liquid and silica powder removed by extraction, after the shaping.

Also, the present inventors, et al., have found that a process of melt-extruding a vinylidene fluoride resin having a specific molecular weight characteristic together with a plasticizer and a good solvent for the vinylidene fluoride resin into a hollow fiber-form and then removing the plasticizer by extraction to render the hollow fiber porous is effective for formation of a porous membrane of vinylidene fluoride resin having minute pores of appropriate size and distribution and also excellent in mechanical strength, and have made a series of proposals (Patent documents 7-10 and others). However, a strong demand exists for further improvements of overall performances including filtration performances and mechanical performances of the porous membrane necessary for use as a filtration membrane. For example, as an MF (microfiltration) membrane used for the purpose of, e.g., production of potable water or industrial water by clarification of river water, etc., or clarification of sewage, it is required to have an average pore size of at most 0.25 μm for secure removal of *Cryptosporidium, Escherichia coli*, etc., as typical injurious micro-organisms, and causes little contamination (clogging) with organic substances on the occasion of continuous filtration operation of cloudy water, to maintain a high water permeation rate. From this viewpoint, a porous membrane proposed by Patent document 6 below has an excessively large average pore size, and a hollow-fiber porous membrane proposed by Patent document 8 retains a problem in maintenance of a water permeation rate in continuous filtration operation of cloudy water.

Such an increase in water filtration pressure due to clogging has been considered to be an inevitable problem accompanying a water filtration operation performed for removing dispersed minute particles in water to be treated by using a hydrophobic vinylidene fluoride resin porous membrane. Of course, although trials for reducing the increase in water filtration pressure due to clogging by hydrophilization of the vinylidene fluoride resin itself or the partial hydrophilization of porous membranes formed of vinylidene fluoride resin have been conducted, an essential solution has not been attained thereby, mostly due to insufficient sustainability of the effect, or confronting problems, such as lowering in membrane strengths or resistance to chemicals.

PRIOR ART DOCUMENTS

Patent Documents

[Patent document 1] JP-A 63-296939
[Patent document 2] JP-A 63-296940
[Patent document 3] JP-A 3-215535
[Patent document 4] JP-A 7-173323
[Patent document 5] WO01/28667A
[Patent document 6] WO02/070115A
[Patent document 7] WO2005/099879A
[Patent document 8] WO2007/010832A
[Patent document 9] WO2008/117740A
[Patent document 10] WO2010/082437A

DISCLOSURE OF INVENTION

Problems to be Solved by the Invention

An object of the present invention is to provide a porous membrane of vinylidene fluoride resin which has a surface pore size, a liquid permeation rate (water permeation rate) and mechanical strength, particularly suitable for separation and particularly for water (filtration) treatment, and also shows good liquid-permeation-rate maintenance performance, even when applied to continual separation treatment.

A further object of the present invention is to provide a vinylidene fluoride resin porous membrane which is hardly soiled to maintain good water permeation rate even when applied to continual filtration of cloudy water and is excellent in regeneratability such that, when required, it can easily reduce the water filtration pressure increased thorough such a continual water filtration by a chemical treatment.

A further object of the present invention is to provide an efficient process for producing the above-mentioned vinylidene fluoride resin porous membrane, and a process for producing filtration water by use thereof.

Means for Solving the Problems

The present invention aims at achieving the above-mentioned object, mainly by controlling physically minute texture near the treated liquid-side surface of a porous membrane. The present inventors achieved the object through an analysis by using a focused ion beam-scanning electron microscope (which is hereinafter sometimes called "FIB-SEM" according to its popular abbreviation). It could be easily analogized in itself that the liquid treatment performance of a porous membrane is influenced by the minute texture of the treated liquid-side surface. However, the usual SEM method used heretofore for such a texture analysis was unsatisfactory for the above-mentioned object. A first reason thereof is that a sample cross-section exposed as an object for observation in the usual SEM method has been obtained by cutting with a microtome, whereas a detailed texture has been spoiled by rubbing with the microtome and the cross-section has already become different from the original texture of the porous membrane. Moreover, the usual SEM method, by nature, allows only a planar observation of one cross-section of a sample, or two or more cross-sections at different parts, and does not allow a three-dimensional analysis. On the other hand, the FIB-SEM method allows a SEM observation of a sample surface obtained by exposing a sample cross-section (about 10×10 μm) by microtome cutting or mechanical polishing similarly as in the usual SEM method, and irradiating the exposed cross-section with focused ion beams (FIB) of, e.g., Ga (gallium), to remove an about 20-nm thickness portion disturbed by the exposure with the microtome etc., of the cross-sectional surface, so that a sectional observation of an almost natural texture of the sample. Moreover, since the irradiation with FIB performs about 20 nm of renewal of the sample cross-section at a time and can be repeated about an almost identical part, a stereoscopic analysis near the surface of a vinylidene fluoride resin porous membrane becomes possible by piling of the planar pictures at the identical parts. As a result of the analysis by such FIB-SEM, it has been discovered that the vinylidene fluoride resin porous membrane of the present invention, has not only a small surface pore size P1 of at most 0.30 μm already confirmed by the usual SEM observation but also a high porosity A1 of at least 60%, near the surface, and is composed of extremely thin network resin fibers of at most 100 nm in average diameter near the surface in order to satisfy an apparently contradictory combination of such a small surface pore size P1 and a high porosity A1. More specifically, the porous membrane of vinylidene fluoride resin according to the present invention is characterized by: including a 10 μm-thick portion contiguous to one surface thereof which comprises network resin fibers having an average diameter of at most 100 nm and shows a porosity A1 of at least 60% as measured by a focused ion beam-scanning electron microscope, and showing a surface pore size of at most 0.3 μm on said one surface thereof. Hereinafter, the above-mentioned 10 μm-thick portion contiguous to one surface, may be sometimes called a "one-surface (treated water)-side surface layer" or simply a "surface layer".

It has been confirmed that, owing to its surface layer of the above-mentioned fine texture, the vinylidene fluoride resin porous membrane of the present invention is excellent not only in a minute particle-blocking property as understood from a small surface pore size but also in prevention of soiling (clogging) during liquid processing (particularly, water filtration) operation and regeneratability, when required. A mechanism which is now presumed by the present inventors as explaining this point will be described hereafter based on the MBR (membrane bioreactor) process for which the porous membrane of the present invention classified as a MF (microfiltration) membrane shows particularly excellent adaptability, as an example.

Major membrane-soiling components in the MBR process include: (a) suspended particles having particle sizes of several μm—several hundred μm, (b) smaller colloidal particles having a particle size distribution showing a peak in 0.2 μm-0.5 μm, for example, and (c) a soluble organic component at several mg/L—several ten mg/L contained in treated water (water to be treated). (a) During the filtration, the suspended particles are pushed against the membrane surface at a force which is larger at a larger treated water flux passing through the membrane, and the high porosity A1 near the surface of the porous membrane of the present invention functions to reduce treated water flux passing through the membrane, thus reducing the force pressing the suspended particles against the membrane surface. Particularly, when a rising stream is formed along a membrane surface perpendicular to the treated water flux by aeration in the MBR process, it becomes more probable that the suspended particles are removed along with the rising stream if the force pressing the suspended particles against the membrane surface becomes smaller. (b) In case where the membrane surface pore size is larger than the colloidal particle size, the colloidal particles can entirely fit in the pores or form bridges in the pores to clog the pores, thus causing a remarkable increase in filtration resistance. However, the porous membrane of the present invention having a surface pore size of at most 0.3 μm is, at least, less likely to cause such a remarkable clogging with colloidal particles. Although the above-mentioned (a) suspended particles and (b) colloidal particle, are liable to deposit on the membrane surface to form a pressed and densified cake layer, it has been confirmed that the porous membrane of the present invention is less likely to form such a cake layer (as shown in the after-mentioned Examples). (c) The dissolved organic component in treated water sticks with time to the entire membrane surfaces including the inside of pores, to gradually cause thinning of the pores, thus causing a rise of water filtration pressure. Although it is difficult to prevent physically the rise of the water filtration pressure, it is possible to apply the CIP (Clean In Place) process, or the cleaning in apparatus, or reverse injection of chemical liquid wherein a chemical liquid is injected for several minutes to several ten minutes reversely from the filtrated water side, thereby efficiently removing the stuck dissolved component. Particularly, it has been confirmed that the porous membrane of the present invention with little cake layer formation advances very smoothly the CIP process (as shown in the after-mentioned Examples).

Accordingly, the process for producing filtrated water of the present invention applies the above-mentioned porous membrane of the present invention to the MBR process or/and the CIP process, and more specifically, is characterized by using the above-mentioned porous membrane of the present invention for filtration of water to be treated, while performing the filtration and aeration of a water-to-be treated side of the porous membrane simultaneously or alternately, and optionally including a step of injecting a chemical liquid from the filtrated water side of an above-mentioned vinylidene fluoride resin porous membrane, as needed, to wash the membrane.

In order to realize the above-mentioned textural or structural characteristics of the vinylidene-fluoride-resin porous membrane, it has been found very important to select a plasticizer forming the melt-kneaded composition before cooling by melt-kneading with a vinylidene fluoride resin is very important; more specifically preferred to use a relatively large amount of plasticize that has a mutual solubility with vinylidene fluoride resin under heating (at a melt-kneading composition-forming temperature) and provides the melt-kneaded composition with a crystallization temperature Tc'( ) which is almost equal to the crystallization temperature Tc( ) of the vinylidene-fluoride-resin alone, to carry out a melt-kneading with a vinylidene fluoride resin of high-molecular weight, and to cool the resultant film-like material from one side thereof, followed by cooling for solidification of the film and extraction of the plasticizer, to provide a porous membrane with an asymmetrical gradient-network-texture. From this viewpoint, it is undesirable either to use a small amount of plasticizer that lowers Tc of a vinylidene fluoride resin as shown in Patent document 4 or to use a plasticizer that lowers Tc of a vinylidene fluoride resin to form a porous membrane retaining spherulite structure as shown in Patent document 5. Moreover, it is undesirable to use a large amount of good solvent of a vinylidene fluoride resin that has been used in order to promote homogeneous mixing with film-starting-material resin and a plasticizer in Patent documents 7-10, etc. and has a mutual solubility with a cooling fluid, as it lowers the crystallization temperature of the melt-kneaded composition and causes a difficulty in control of a surface pore size.

The process for producing a porous membrane according to the present invention, comprises: melt-extruding a composition obtained by melt-kneading 20-50 wt. % of a vinylidene fluoride resin having a weight-average molecular weight of at least 300,000 and 50-80 wt. % of a plasticizer into a form of a film; cooling the film preferentially from one side thereof with a liquid inert to the vinylidene fluoride resin to solidify the film; and extracting the plasticizer to recover a porous membrane having an asymmetrical gradient-network-texture; wherein the plasticizer comprises a polyester plasticizer which is mutually soluble with the vinylidene fluoride resin at a temperature forming the melt-kneaded composition and provides the melt-kneaded composition with a crystallization temperature which is substantially identical to a crystallization temperature of the vinylidene fluoride resin alone, and the porous membrane after the extraction is stretched while selectively wetting the porous membrane to a depth which is at least 5 μm and at most ½ of the membrane thickness from the outer surface of the membrane.

The above-mentioned process for producing a vinylidene-fluoride-resin porous membrane of the present invention is classified as a production process of the vinylidene-fluoride-resin porous membrane by the temperature-induced phase separation method utilizing a difference in temperature between the high crystallization temperature of the melt-kneaded composition of a vinylidene fluoride resin and a polyester plasticizer, and the cooling temperature. In contrast thereto, (i) the film formation according to the non solvent-induced phase separation method of contacting a vinylidene-fluoride-resin solution with a liquid (generally a non-solvent for a vinylidene fluoride resin) to cause coagulation and solidification as disclosed in Patent documents 1 and 2, is accompanied with difficulties such that the resultant membrane is liable to have a film thereon and caused to have a surface layer which is thin and has a high resin density (i.e., a low porosity), due to slow intra-membrane diffusion (mass transfer) of the non-solvent. Moreover, (ii) it has been confirmed that the method of extraction-removal of dispersed silica powder as disclosed in the above-mentioned Patent document 3 is accompanied with technical difficulty in uniformly dispersing the silica powder to the proximity of the membrane surface, thus failing to provide a vinylidene-fluoride-resin porous membrane including a surface layer having a small surface pore size on the side of water to be treated and a high porosity, as a characteristic of the present invention.

EMBODIMENTS FOR PRACTICING THE INVENTION

The porous membrane of the present invention can be formed in either a planar membrane or a hollow-fiber membrane, but may preferably be formed in a hollow-fiber membrane which can enlarge the membrane area per unit volume of filtration apparatus, particularly water filtration treatment.

Hereafter, the porous membrane of vinylidene fluoride resin, principally in a hollow-fiber form, of the present invention will be described in the order of the production process of the present invention which is a preferred process for production thereof.

(Vinylidene Fluoride Resin)

The vinylidene fluoride resin used as a principal starting material of the membrane in the present invention may be homopolymer of vinylidene fluoride, i.e., polyvinylidene fluoride, or a copolymer of vinylidene fluoride together with a monomer copolymerizable with vinylidene fluoride, or a mixture of these, having a weight-average molecular weight of preferably at least $3\times10^5$, particularly preferably $3\times10^5$ to $8\times10^5$. Examples of the monomer copolymerizable with vinylidene fluoride may include: tetrafluoroethylene, hexafluoropropylene, trifluoroethylene, chlorotrifluoroethylene and vinylidene fluoride, which may be used singly or in two or more species. The vinylidene fluoride resin may preferably comprise at least 70 mol % of vinylidene fluoride as the constituent unit. Among these, it is preferred to use homopolymer consisting of 100 mol % of vinylidene fluoride in view of its high crystallization temperature Tc (° C.) and high mechanical strength.

A vinylidene fluoride resin of a relatively high molecular weight as described above may preferably be obtained by emulsion polymerization or suspension polymerization, particularly preferably by suspension polymerization.

The vinylidene fluoride resin forming the porous membrane of the present invention may preferably have a good crystallinity, as represented by a difference Tm2−Tc of at most 32° C., preferably at most 30° C., further preferably at most 28° C., between an inherent melting point Tm2 (° C.) and a crystallization temperature Tc (° C.) of the resin as determined by DSC measurement in addition to the above-mentioned relatively large weight-average molecular weight of at least $3\times10^5$.

Herein, the inherent melting point Tm2 (° C.) of resin should be distinguished from a melting point Tm1 (° C.) determined by subjecting a procured sample resin or a resin constituting a porous membrane as it is to a temperature-increase process according to DSC. More specifically, a vinylidene fluoride resin procured generally exhibits a melting point Tm1 (° C.) different from an inherent melting point Tm2 (° C.) of the resin, due to thermal and mechanical history thereof received in the course of its production or heat-forming process, etc. The melting point Tm2 (° C.) of vinylidene fluoride resin defining the present invention defined as a melting point (a peak temperature of heat absorption according to crystal melting) observed in the course of DSC re-heating after once subjecting a procured sample resin to a prescribed temperature increase and decrease cycle in order to remove the thermal and mechanical history thereof, and details of the measurement method will be described prior to the description of Examples appearing hereinafter.

The vinylidene fluoride resin satisfying the condition of Tm2−Tc≤32° C. may preferably be provided as a mixture formed by blending 25-98 wt. %, preferably 50-95 wt. %, further preferably 60-90 wt. % of a vinylidene fluoride resin having a weight-average molecular weight of $2.0 \times 10^5$-$6.7 \times 10^5$, preferably $3.0 \times 10^5$-$6.5 \times 10^5$, further preferably $4.0 \times 10^5$-$6.0 \times 10^5$, as a medium-to-high molecular weight matrix vinylidene fluoride resin (PVDF-I) and 2-75 wt. %, preferably 5-50 wt. %, further preferably 10-40 wt. %, of a crystallinity modifier vinylidene fluoride resin of an ultra-high-molecular weight (PVDF-II) having a weight-average molecular weight that is at least 1.8 times, preferably at least 2 times, that of the medium-to-high molecular weight vinylidene fluoride resin and at most $1.2 \times 10^6$, wherein each vinylidene fluoride resin is selected from the above-mentioned species of the vinylidene fluoride resins. Of these, the medium-to-high molecular-weight component functions as a so-called matrix resin for keeping a high molecular weight level as a whole of the vinylidene fluoride resin and providing a hollow-fiber porous membrane with excellent strength and water permeability. On the other hand, the ultrahigh molecular weight component, combined with the above-mentioned medium-to-high molecular-weight component, raises the crystallization temperature Tc of the starting resin (generally about 140° C. for vinylidene fluoride resin alone), raises the crystallization temperature Tc' of the melt-kneaded composition together with a plasticizer described later and raises the viscosity of the melt-extrusion composition to reinforce it, thereby allowing stable extrusion in the hollow-fiber form, in spite of high plasticizer content. By raising Tc, on the occasion of the preferential cooling from the outer surface of the hollow fiber film formed by the melt-extrusion, it becomes possible to accelerate the solidification of the vinylidene fluoride resin from the inside to the inner surface of which the solidification is liable to be retarded compared with the outer film surface, so that growth of spherulites can be suppressed. Tc is preferably at least 143° C., further preferably at least 145° C. Generally, Tc of the vinylidene fluoride resin used does not substantially change in the production process of a hollow fiber. Therefore, it can be measured by using a product hollow-fiber porous membrane as a sample according to the DSC method described later.

If the Mw of the ultra-high molecular weight vinylidene fluoride resin (PVDF-II) is less than 1.8 times the Mw of the medium-to-high molecular weight resin(PVDF-I), it becomes difficult to fully suppress the growth of spherulites, and if the Mw exceeds 1,200,000 on the other hand, it becomes difficult to uniformly disperse it in the matrix resin.

Both vinylidene fluoride resins of a medium-to-high molecular weight and an ultra-high molecular weight as described above, may preferably be obtained by emulsion polymerization or suspension polymerization, particularly preferably by suspension polymerization.

Moreover, if the addition amount of the ultra-high molecular weight vinylidene fluoride resin is less than 2 wt. %, the effects of spherulite suppression and viscosity-increasing and reinforcing the melt-extrusion composition are not sufficient, and in excess of 75 wt. %, there result in increased tendencies such that the texture of phase separation between the vinylidene fluoride resin and the plasticizer becomes excessively fine to result in a porous membrane exhibiting a lower water permeation rate when used as a microfiltration membrane, and the stable film or membrane formation becomes difficult due to melt fracture during the processing.

In the production process of the present invention, a plasticizer is added to the above-mentioned vinylidene fluoride resin, to form a starting composition for formation of the membrane.

(Plasticizer)

The hollow-fiber porous membrane of the present invention is principally formed of the above-mentioned vinylidene fluoride resin, but for the production thereof, it is preferred to use at least a plasticizer for vinylidene fluoride resin as a pore-forming agent in addition to the vinylidene fluoride resin. The plasticizer used in the present invention is one which is mutually soluble with the vinylidene fluoride resin at the melt-kneading temperature and also provides to the melt-kneaded mixture with the vinylidene fluoride resin a crystallization temperature Tc' (° C.) that is substantially identical to (namely, within a range of ±5° C., preferably ±4° C., still more preferably ±2° C. from) the crystallization temperature Tc (° C.) of the vinylidene-fluoride-resin alone. Such a plasticize may generally be chosen from plasticizers comprising polyesters of a dibasic acid and a glycol, so as to provide a number-average molecular weight (as calculated from a saponification value and a hydroxyl value measured according to JIS K0070) of at least 1200, more preferably at least 1500, and further preferably at least 1700. A larger molecular weight of polyester plasticizer tends to provide a higher mutual solubility with vinylidene fluoride resin, but an excessively large molecular weight is liable to require a long time for extraction-removal of the plasticizer in a extraction step described later, so that a number-average molecular weight exceeding 10,000 is not preferred. Generally, a viscosity measured at 25° C. according to JIS K7117-2 (by means of a cone-plate type rotating viscometer) may also be frequently used as a measure of degree of polymerization of a polyester plasticizer, and one having at least 1000 mPa-s and at most 1000 Pa-s may preferably be used.

As a dibasic acid component giving such a polyester plasticizer, it is preferred to use an aliphatic dibasic acid having 4-12 carbon atoms. Examples of such aliphatic dibasic acids may include: succinic acid, maleic acid, fumaric acid, glutamic acid, adipic acid, azelaic acid, sebacic acid, and dodecanedicarboxylic acid. Among these, aliphatic dibasic acids having 6-10 carbon atoms are preferred so as to provide a polyester plasticizer with good mutual solubility with vinylidene fluoride resin, and adipic acid is particularly preferred in view of its commercial availability. These aliphatic dibasic acids may be used alone or in combination of two or more species thereof.

As a glycol component which constitutes a polyester plasticizer, it is preferred to use a glycol having 2-18 carbon atoms, and examples thereof may include: aliphatic dihydric alcohols, such as ethylene glycol, 1,2-propylene glycol, 1,2-butanediol, 1,3-butanediol, 1,4-butanediol, 2-methyl-1,3-propanediol, neopentyl glycol, 1,5-pentanediol, 1,6-hexanediol, 2,2-diethyl 1,3-propanediol, 2,2,4-tri-methyl-1,3-pentanediol, 2-ethyl-1,3-hexanediol, 1,9-nonanediol, 1,10-decanediol, 2-butyl-2-ethyl-1,5-propanediol, and 1,12-octadecanediol; and polyalkylene glycols, such as diethylene glycol and dipropylene glycol, are mentioned. Particularly, glycols having 3-10 carbon atoms may preferably be used. These glycols may be used alone or in combination of two or more species thereof.

Generally, in order to cap the molecular chain terminals of a polyester plasticizer, a monohydric alcohol or a monobasic carboxylic acid may be used. Examples of such a monohydric alcohol may include: monohydric alcohols of 2-22 carbon atoms, such as butyl alcohol, hexyl alcohol, isohexyl alcohol, heptyl alcohol, octyl alcohol, isooctyl alcohol, 2-ethylhexyl alcohol, nonyl alcohol, isononyl alcohol, 2-methyloctyl alcohol, decyl alcohol, isodecyl alcohol, undecyl alcohol, dodecyl alcohol, tridecyl alcohol, a tetradecyl alcohol, hexadecyl alcohol, octadecyl alcohol, etc. It is particularly preferred to use a monohydric alcohol having 9-18 carbon atoms, which generally tends to provide a plasticizer capable of suppressing the decrease of crystallization temperature Tc' of the melt-kneaded material with the vinylidene fluoride resin. Especially, isononyl alcohol is preferred from the viewpoint of the balance of mutual solubility with vinylidene fluoride resin and the capability of suppressing the lowering of Tc'. These monohydric alcohols may be used alone or in combination of two or more species thereof.

On the other hand, the monobasic carboxylic acids may include: aliphatic monobasic carboxylic acids having 6-22 carbon atoms derived from animal-and-vegetable oils and fats or the hardened oils thereof; or synthetic monobasic carboxylic acids of 2-18 carbon atoms, such as acetic acid, butyric acid, isobutyric acid, heptanoic acid, an isooctanoic acid, 2-ethyl hexanoic acid, nonanoic acid, and isostearic acid; and aromatic carboxylic acids, such as benzoic acid, toluic acid, dimethylaromatic monocarboxylic acid, ethylaromatic monocarboxylic acid, a cumin acid, tetramethylaromatic monocarboxylic acid, naphthoic acid, biphenylcarboxylic acid, and furoic acid. These may be used alone or in combination of two or more species thereof.

A polyester plasticizer having a relatively large molecular weight, when added alone, tends to lower the crystallization temperature Tc' of the melt-kneaded material with vinylidene fluoride resin, so that it is preferred to add a mutual solubility inhibitor in addition to such a polyester plasticizer. As such a mutual solubility inhibitor, it is preferred to use a monomeric ester plasticizer which is an ester between a dibasic acid selected from aromatic dibasic acids, such as phthalic acid and trimellitic acid or aliphatic dibasic acids, such as adipic acid, and a monohydric alcohol of 2-22 carbon atoms, and is mutually insoluble with vinylidene fluoride resin. Especially, it is preferred to use a monomeric ester plasticizer between an aliphatic dibasic acid of 6-10 carbon atoms, especially adipic acid, and a monohydric alcohol of 2-22 carbon atoms, especially 6-18 carbon atoms. Moreover, it is preferred to use a monomeric ester plasticizer consisting of a dibasic acid and a monohydric alcohol, wherein the dibasic acid is common to the dibasic acid of the polyester plasticizer or/and the monohydric alcohol has an identical number of carbon atoms with the glycol or the terminal-capping monohydric alcohol of the polyester plasticizer, in view of good mutual solubility with the polyester plasticizer. In case where used in combination with an adipic acid-based polyester plasticizer including adipic acid as a dibasic acid and a terminal capped with nonyl alcohol, which is preferably used in the present invention, it is suitable to use diisononyl adipate (DINA).

Such a monomeric ester plasticizer may be used in a quantity, which should be determined depending on the Tc'-decreasing power of the polyester plasticizer to be used, and should preferably be determined experimentally, so as not to impair the mutual solubility with the vinylidene fluoride resin but to suppress the Tc'-decreasing power as much as possible. This is because the Tc' decrease power of a polyester plasticizer is intricately affected with a chemical structure, a number average molecular weight (degree of polymerization), a molecular weight distribution, etc., of components, such as a dibasic acid, a glycol component and a monohydric alcohol of the polyester plasticizer, and cannot be generally predicted. For example, in the case of using a polyester plasticizer having a number-average molecular weight of 1800 and consisting of adipic acid, 1,2-butanediol and isononyl alcohol, good results have been obtained, if a monomeric ester plasticizer is used in a mixed proportion of preferably 2-30 wt. %, more preferably 5-25 wt. %, most preferably 8-20 wt. %, with respect to a total amount with the polyester plasticizer. Moreover, in the case of using a polyester plasticizer having a number-average molecular weight of 2200 and consisting of adipic acid, 1,4-butanediol and octyl alcohol, good results have been obtained, if a monomeric ester plasticizer is used in a mixed proportion of preferably 5-50 wt. %, more preferably 10-45 wt. %, most preferably 15-40 wt. %, with respect to a total amount with the polyester plasticizer.

By using a vinylidene fluoride resin having a preferred molecular weight characteristic, and selecting a preferred polyester plasticizer (further a mutual solubility inhibitor), as described above, it becomes possible to provide the melt-kneaded material of a vinylidene fluoride resin and a plasticizer with a crystallization temperature Tc' of preferably at least 140° C., more preferably at least 143° C., further preferably at least 145° C. It is, however, generally difficult to realize a Tc' exceeding 170° C.

Furthermore, in order to shorten the time for melt-kneading the polyester plasticizer and the vinylidene fluoride resin, or in order to perform viscosity adjustment of the melt-kneaded material, it is possible to add a solvent or monomeric ester plasticizer which is mutually insoluble with a cooling liquid (preferably water) mentioned later and mutually soluble with vinylidene fluoride resin. Examples of such a solvent may include propylene carbonate, and examples of such a monomeric ester plasticizer may include dialkylene glycol dibenzoate consisting of glycol and benzoic acid. However, such a solvent or a monomeric ester plasticizer is liable to lower the Tc' of melt-kneading material if it is used excessively, so that amount thereof should be suppressed to at most 10 wt. %, particularly at most 5 wt. %, with respect to a total amount with the plasticizer.

In the present invention, the polyester plasticizer (or a mixture of the polyester plasticizer with the mutual solubility inhibitor, etc.) is required to have a mutual solubility with the vinylidene fluoride resin to such an extent that it provides a melt-kneaded mixture which is clear (that is, it does not leave a material giving a turbidity recognizable with naked eyes) when melt-kneaded with vinylidene fluoride resin by means of an extruder. However, the formation of a melt-knead mixture by means of an extruder includes factors, such as mechanical conditions, other than those originated from starting materials, so that the mutual solubility is judged according to a mutual solubility evaluation method as described later is used in the present invention in order to eliminate such other factors.

(Composition)

The starting material composition for forming a porous-membrane may preferably comprise: 20-50 wt. %, preferably 25-40 wt. %, of vinylidene fluoride resin, and 50-80 wt. %, preferably 60-85 wt. %, of a plasticizer (including a polyester plasticizer and a mutual solubility inhibitor (monomeric ester plasticizer), when used in addition to the polyester plasticizer). The optional ingredients, such as a water-insoluble solvent, etc., may used in consideration of the melt viscosity under melt-kneading of the material composition, etc., in such a manner as to replace a portion of the plasticizer.

If the amount of the plasticizer is too small, it becomes difficult to achieve an increased porosity of the surface layer as an object of the present invention, and if too large, the melt viscosity is lowered excessively, thus being liable to result in collapse of hollow fiber film in the case of forming a hollow-fiber membrane and also lower mechanical strengths of the resultant porous membrane.

(Mixing and Melt-Extrusion)

The melt-extrusion composition at a barrel temperature of 180-250° C., preferably 200-240° C., may be extruded into a hollow-fiber film by extrusion through a T-die or an annular nozzle at a temperature of generally 150-270° C., preferably 170-240° C. Accordingly, the manners of mixing and melting of the vinylidene fluoride resin, and the plasticizer and optionally added non-water-miscible solvent (which may be hereinafter inclusively referred to as "plasticizer, etc.") are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of a principal resin and a crystallinity-modifier resin) is supplied from an upstream side of the extruder and the plasticizer, etc., are supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough. The die or nozzle temperature Td may preferably be higher by at least 30° C., more preferably by at least 50° C., than the crystallization temperature Tc' of the composition. This is because the composition is not crystallized during its passage through the air gap but quenched in the cooling bath to be finely crystallized to provide a texture with a small diameter of network resin fiber, as a result thereof. Further, the melt fracture of the composition comprising a high-molecular weight of vinylidene fluoride resin or plasticizer, can be prevented thereby.

(Cooling)

Then, the melt-extruded hollow-fiber film is cooled preferentially from an outside thereof and solidified by introducing it into a cooling liquid bath containing a liquid (preferably water) that is inert (i.e., non-solvent and non-reactive) to vinylidene fluoride resin, at −40-90° C., preferably 0-90° C., more preferably 5-60° C., to form a film. In this instance, if a hollow-fiber film is cooled while an inert gas, such as air or nitrogen, is injected into the hollow part thereof, a hollow-fiber film having an enlarged diameter can be obtained. This is advantageous for obtaining a hollow-fiber porous membrane which is less liable to cause a lowering in water permeation rate per unit area of the membrane even at an increased length of the hollow-fiber membrane (WO2005/03700A). for the formation of a planar film, the cooling from one side thereof can be effected by showering with a cooling liquid or cooling by means of a chill roll. At a cooling medium temperature below −40° C., the solidified film becomes brittle to make the drawing difficult. Below 0° C., moisture in the atmosphere is liable to cause dew or frost, thus resulting in a difficulty of requiring a complex apparatus. On the other hand, in excess of 90° C., it becomes difficult to form a porous membrane having a small surface pore size and a gradient pore size distribution aimed at by the present invention.

The difference Tc'−Tq between the crystallization temperature Tc' of the kneaded composition of the vinylidene fluoride resin and the plasticizer, and the temperature Tq of the inert liquid for cooling, is preferably at least 60° C., further preferably 75° C. or more, most preferably 90° C. or more. A temperature difference exceeding 150° C. generally requires a cooling liquid temperature of less than 0° C., thus being undesirable because the use of water as preferred cooling liquid becomes difficult.

In order to prevent the collapse of a melt-extruded hollow-fiber film, it is preferred to take a time after the melt-extrusion and before entering the cooling bath (i.e., an air gap passage time=air gap/melt-extrudate take-up speed), which is generally 0.3-10.0 sec., particularly 0.5-5.0 sec.

(Extraction)

The cooled and solidified film is then introduced into an extraction liquid bath to remove the plasticizer, etc. therefrom. The extraction liquid is not particularly restricted provided that it does not dissolve the vinylidene fluoride resin while dissolving the plasticizer, etc. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

(Stretching)

The film or membrane after the extraction may preferably be subjected to stretching in order to increase the porosity and pore size and improve the strength-elongation characteristic thereof. It is particularly preferred to selectively wet the film or porous membrane after extrusion down to a certain depth from the outer surface thereof, prior to the stretching, and then effect the stretching in this state (which may be hereinafter referred to as "partially wet stretching"), for the purpose of attaining a high porosity A1 of surface layer. More specifically, prior to the stretching, the porous membrane is wetted to a certain depth of at least 5 μm, preferably at least 7 μm, further preferably at least 10 μm and at most ½, preferably at most ⅓, further preferably ¼ or less, of the membrane thickness. A wet depth of less than 5 μm is insufficient for an increase of surface layer porosity A1, and a wet depth in excess of ½ is liable to result in uneven drying of the wetting liquid during dry heat relaxation after the stretching, thus leading to uneven heating and relaxation effect.

The reason why the above-mentioned partially wet stretching is effective for providing an increased surface layer porosity A1 has not been clarified as yet but is adduced as follows by the present inventors. During a longitudinal stretching, a compression force acts in a thicknesswise direction, and as a result of wetting to a certain depth from the outer surface, (a) thermal conduction within a heating bath is improved to alleviate a temperature gradient in the surface layer and reduce the compression forth in the thickness direction, and (b) the pores are filled with the liquid so that the pores are not readily collapsed even if the thicknesswise compression force is applied thereto.

As a specific method for wetting down to a certain depth from an outer surface, it is possible to apply a solvent wetting vinylidene fluoride resins, such as methanol and ethanol, or an aqueous solution thereof selectively to the outer surface of the porous-membrane. However, in order to provide a selective applicability to the outer surface of a vinylidene-fluoride-resin porous membrane, the application of (inclusive of application by dipping within) a wettability promoter liquid having a surface tension of 25-45 mN/m is preferred. A surface tension less than 25 mN/m provides an excessively fast penetration to the PVDF porous membrane, thus being liable to make difficult the selective application of the wettability promoter liquid onto the outer surface, and a surface tension exceeding 45 mN/m is liable to cause the wettability promoter liquid to be repelled by the outer surface of the PVDF porous membrane, thus making difficult the uniform application of the liquid onto the outer surface, because of insufficient wettability or penetrability to the PVDF porous membrane. It is particularly preferred to use a surfactant liquid (i.e., an aqueous solution or aqueous homogeneous dispersion liquid of a surfactant) obtained by adding a surfactant into water as such a wettability promoter liquid. The type of surfactant is not particularly limited, and examples thereof may include: anionic surfactants inclusive of carboxylate salt type, such as an aliphatic-monocarboxylic-acid salt, sulfonic acid type, such as an alkylbenzene sulfonate, sulfate type, such as an alkyl sulfate salt, and phosphate type, such as a phosphoric acid alkyl salt; cationic surfactants, inclusive of amine salt type, such as an alkylamine salt, and quaternary ammonium salt type, such as an alkyl trimethyl-ammonium salt; nonionic surfactants, inclusive of ester types, such as a glycerin fatty acid ester, ether type, such as polyoxyethylene alkyl phenyl ether, ester ether type, such as polyethylene glycol fatty acid ester; amphoteric surfactants inclusive of carboxy betaine type, such as N,N-dimethyl-N-alkyl betaine aminoacetate, and glycin type, such as 2-alkyl 1-hydroxyethyl-carboxymethyl-imidazolinium betaine, etc. Polyglycerin fatty acid esters are particularly preferably used as wettability promoter liquids which are free from hygienic problem even if they finally remain in the product porous membrane The surfactant may preferably be one having an (hydrophile-lipophilie balance) of 8 or more. At an HLB of less than 8, the surfactant is not finely dispersed in water, so that it becomes difficult to effect uniform wettability promotion. A particularly preferred class of surfactants may include: nonionic surfactants or ionic (anionic, cationic, amphoteric) surfactants having an HLB of 8-20, further preferably 10-18, and a nonionic surfactant is especially preferred.

In many cases, the application of the wettability promoter liquid to the porous-membrane outer surface, may preferably be performed by batchwise or continuous dipping of the porous membrane. The dipping treatment functions as an application on both surfaces for a planar membrane and an application on a single surface for a hollow-fiber membrane. The batch dipping treatment of a planar membrane may be applied to a pile of sheets cut in appropriate sizes, and the batch dipping treatment of a hollow-fiber membrane is performed by dipping of the hollow-fiber membrane wound about a bobbin or the like. In the case of batch processing, it is preferred to form relatively large emulsion particles by using a surfactant with a relatively low HLB in the above-mentioned range, more specifically an HLB of 8-13. The continuous processing is performed by continuously feeding and passing an elongated membrane through a treating liquid, both in the case of planar membrane and a hollow-fiber membrane. In case of applying only to one side of a planar membrane, spraying of a treatment solution is also used preferably. In the case of continuous processing, it is preferred to form relatively small emulsion particles by using a surfactant with a relatively high HLB in the above-mentioned range, more specifically an HLB of 8-20, more preferably 10-18.

Although there is no particular limitation in the viscosity of a wettability promoter liquid, it is possible to moderately retard the penetration speed by providing the wettability promoter liquid with a higher viscosity or to accelerate the penetration rate by using a lower viscosity, depending on the manner of applying a wettability promoter liquid.

Although there is no particular restriction in the temperature of the wettability promoter liquid, it is possible to moderately retard the penetration speed by using a lower temperature of wettability promoter liquid or to use a higher temperature to accelerate the penetration speed, depending on the manner of applying a wettability promoter liquid.

Thus, the viscosity and temperature of the wettability promoter liquid can act in mutually opposite directions and can be complementarily controlled for adjustment of the penetration rate of the wettability promoter liquid.

(Stretching)

The stretching of a hollow-fiber membrane may preferably be effected as a uniaxial stretching in the longitudinal direction of the hollow-fiber membrane by means of, e.g., a pair of rollers rotating at different circumferential speeds. This is because it has been found that a microscopic texture including a stretched fibril portion and a non-stretched node portion appearing alternately in the stretched direction is preferred for the hollow-fiber porous membrane of vinylidene fluoride resin of the present invention to exhibit a harmony of porosity and strength-elongation characteristic thereof. The stretching ratio may suitably be on the order of 1.1-4.0 times, particularly about 1.2-3.0 times, most preferably about 1.4-2.5 times. If the stretching ratio is excessively large, the hollow-fiber membrane can be broken at a high liability. The stretching temperature may preferably be 25-90° C., particularly 45-80° C. At too low a stretching temperature, the stretching becomes nonuniform, thus being liable to cause the breakage of the hollow-fiber membrane. On the other hand, at an excessively high temperature, enlargement of pore sizes cannot be attained even at an increased stretching ratio, so that it becomes difficult to attain an increased water permeation rate. In the case of a planar membrane, it is also possible to effect successive or simultaneous biaxial stretching. It is also preferred to heat-treat the porous membrane for 1 sec.-18000 sec., preferably 3 sec.-3600 sec., in a temperature range of 80-160° C., preferably 100-140° C., to increase the crystallinity in advance of the stretching for the purpose of improving the stretchability.

(Relaxation Treatment)

The hollow-fiber porous membrane of vinylidene fluoride resin obtained through the above-mentioned steps may preferably be subjected to at least one stage, preferably at least two stages, of relaxation or fixed length heat treatment in a non-wetting environment (or medium). The non-wetting environment may be formed of non-wetting liquids having a surface tension (JIS K6768) larger than a wet tension of vinylidene fluoride resin, typically water, or almost all gases including air as a representative. The relaxation may be effected by passing a hollow-fiber porous membrane stretched in advance through the above-mentioned non-wetting, preferably heated environment disposed between an upstream roller and a downstream roller rotating at successively decreasing circumferential speeds. The relaxation percentage determined by (1−(the downstream roller circumferential speed/the upstream roller circumferential speed))×100 (%) may preferably be totally 0% (fixed-length heat treatment) to 50%, particularly 1-20% of relaxation heat treatment. A relaxation percentage exceeding 20% is difficult to realize or, even if possible, can only result in a saturation or even a decrease of the effect of increasing the water permeation rate, while it may somewhat depend on the stretching ratio in the previous step, so that it is not desirable.

The first stage relaxation temperature may preferably be 0-100° C., particularly 50-100° C. The relaxation treatment time may be either short or long as far as a desired relaxation percentage can be accomplished. It is generally on the order of from 5 second to 1 minute but need not be within this range.

A latter stage relaxation treatment temperature may preferably be 80-170° C., particularly 120-160° C., so as to obtain a relaxation percentage of 1-20%.

The effect of the above-mentioned relaxation treatment is an increase in water permeation rate of the resultant hollow-fiber porous membrane, while substantially retaining a sharp pore size distribution. If the above-mentioned treatment is performed at a fixed length, it becomes a heat-setting after stretching.

(Porous Membrane of Vinylidene Fluoride Resin)

The porous membrane according to the present invention obtained through the above-mentioned series of steps, is principally characterized by: a surface layer structure or texture (a) including a 10 μm-thick portion contiguous to one surface thereof which (a1) comprises network resin fibers having an average diameter of at most 100 nm and (b) shows a porosity A1 of at least 60%, as measured by a focused ion beam-scanning electron microscope (FIB-SEM, and (b) showing a surface pore size of at most 0.3 μm on said one surface thereof.

(a1) Although no particular disadvantages accompany too small an average diameter of the network resin fibers, it is generally difficult to realize less than 10 nm. (a2) The porosity A1 is preferably 65% or more, more preferably 70% or more, and the upper limit is restrained by the structural strength of the surface layer, and tit is difficult to exceed 85%. (b) The one-surface side surface pore size P1 refers to an average diameter determined by observation through an ordinary SEM, and is preferably at most 0.20 μm, more preferably 0.15 μm or less. Although there is no particular lower limit, it is generally difficult to realize less than 0.01 μm.

(FIB-SEM Method)

Now, the outline of the FIB-SEM method, which was used in order to measure (a1) the average diameter (nm) and (a2) the porosity A1(%) of network resin fibers, as the characteristics of the vinylidene fluoride resin porous membrane of the present invention, as described above, will described below.

A hollow-fiber porous membrane sample was dyed with ruthenium oxide, and then embedding within an epoxy resin, and the cured epoxy resin was mechanically polished to produce a cross-sectional sample in which an annular cross-section perpendicular to the longitudinal direction of the hollow-fiber membrane was exposed. The cross-sectional sample was set to the focused ion beam scanning electron microscope (a dual beam FIB/SEM combined instrument; "Nova200 NanoLab", made by EFI Co.) and a 10 μm-square region down to a depth of 10 μm from the outer surface of the hollow-fiber porous membrane was irradiated with Ga (gallium) ion beam to shave off 20 nm in thickness, thereby forming a smooth observed surface (of 10 μm-square), which was then observed and photographed through SEM in a non-vapor-deposited state at an acceleration voltage of 3 keV and an observation magnitude of 10000. Next, the observed surface was again irradiated with Ga (gallium) ion beam to shave off 20 nm in thickness, thereby forming a new observed surface, which was then observed and photographed through SEM in a non-vapor-deposited state at an acceleration voltage of 3 keV and an observation magnitude of 10000. This operation was repeated 100 times at intervals of 20 nm to obtain consecutive 100 SEM photographs including one for the first observed surface to a thickness (depth) of 2 μm.

The photographs were subjected to binary image processing and processed by a three-dimensional image analyzer to form a three-dimensional observation image (in a total observed volume of 200 μm$^2$=2×10$^{11}$ nm$^2$ with respect to a sample of 10 μm×10 μm×2 μm (that is a sample down to a depth of 10 μm for an outer surface region of 10 μm×2 μm)), from which a total volume of fibers, a total volume of voids and the following textural parameters were determined.

Surface layer porosity $A1(\%)$=total volume of voids/ total observed volume×100.

Fiber average diameter (nm): This was determined based on the three-dimensional observation image by measuring a cross-sectional area intersecting a fiber perpendicular to the length for each span between branch points to calculate a circle-equivalent diameter and taking an average of the circle-equivalent diameters.

Number of pore spans between branch points (-): From the three-dimensional observation image, a central line of each pore was obtained to determine a branch point, that is a point where 3 or more lines contact each other or a point where pore diameter changes, and an end point, that is a terminal point not contacting another line, thereby counting a number of pairs of a branch point and a branch point adjacent to each other, a number of pairs of a branch point and an end point adjacent to each other and a number of pairs of an end point and an end point adjacent to each other to obtain a total of these numbers as a number of spans between branch points.

Figure 3:
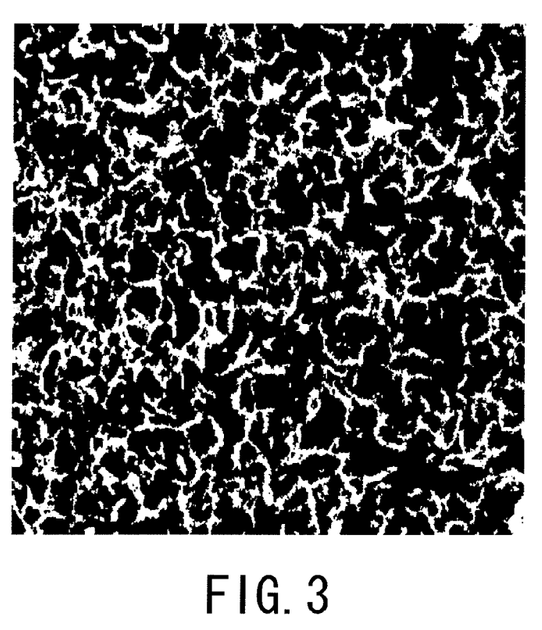
FIG. 3 is an FIB-SEM binary image which shows a cross-sectional texture of a hollow-fiber porous membrane obtained by Example 1.
Figure 4:
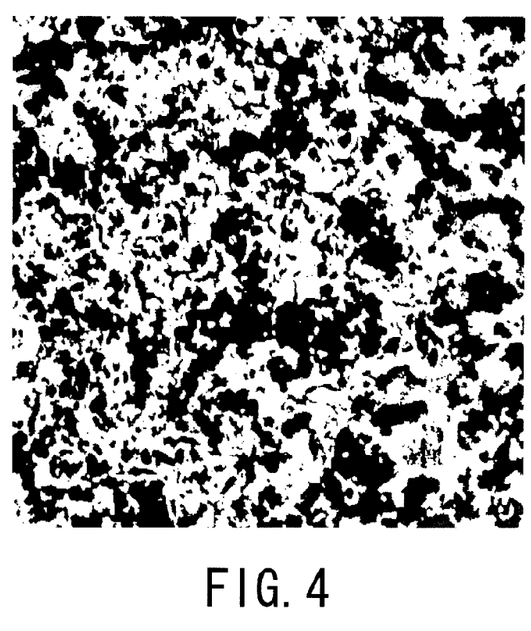
FIG. 4 is an FIB-SEM binary image which shows a cross-sectional texture of a hollow-fiber porous membrane obtained by Comparative Example 1.
Figure 5:
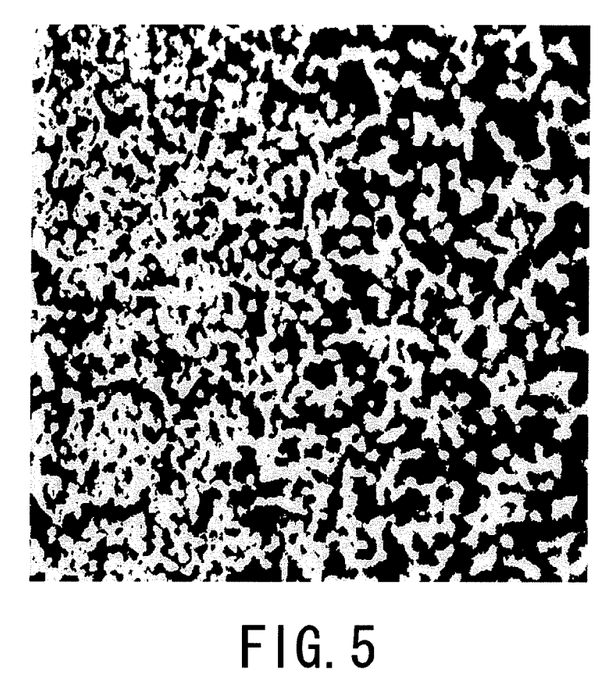
FIG. 5 is an FIB-SEM binary image which shows a cross-sectional texture of a hollow-fiber porous membrane used in Comparative Example 2.

In addition, examples of images after the binary image processing of SEM photographs of the observed surface obtained after shaving off to a depth of 1 μm from the observation start are attached hereto as FIGS. 3-5.

The surface layer in the porous membrane of the present invention is further characterized by a small number of pore spans between branch points per unit volume as small as at most 25 (-/um$^3$). This means that the existing pores have few branches and are less likely to be present as independent pores, thus showing a good permeability of water to be treated.

Further characteristic features of the porous membrane of the present invention in addition to the above, may include: a ratio A1/A2 between the above-mentioned porosity A1(%) of the surface layer (%) to the porosity A2(%) of the whole layer of the porous-membrane is at least 0.90, preferably 0.93 or higher. The upper limit is not particularly limited but is generally 1.1 or less. The whole layer porosity A2(%) is preferably 70 to 85%, more preferably 75 to 82%.

Other general features of the porous membranes of the present invention, when formed in a hollow-fiber form, may include: an average pore size Pm of generally at most 0.25 μm, preferably 0.20-0.01 μm, more preferably 0.15-0.05 μm, and a maximum pore size Pmax of generally 0.70-0.03 μm, preferably 0.40-0.06 μm, respectively as measured by the half-dry/bubble point method (ASTM-F 316-86 and ASTM-E 1294-86); a tensile strength at break of at least 7 MPa; an elongation at break of at least 30%, preferably at least 60%. The thickness is ordinarily in the range of 50-800 μm, preferably 50-600 μm, particularly preferably 150-500 μm. The outer diameter in the form of a hollow fiber may suitably be on the order of 0.3-3 mm, particularly about 1-3 mm. A hollow-fiber membrane may exhibit a pure water permeability of at least 5 m/day, preferably at least 10 m/day, more preferably at least 15 m/day, most preferably 20 m/day or more, as measured at a test length of 200 mm, a temperature of 25° C., and a pressure difference of 100 kPa.

The present invention further includes a process for producing filtrated water, comprising: filtrating water to be treated through the vinylidene fluoride resin porous membrane obtained in the above-described manner, while performing the filtration and aeration of a water-to-be treated side of the porous membrane simultaneously or alternately.

Filtration of cloudy water by the porous membrane of the present invention is assumed to by way of surface filtration since the treated water-side surface pore size P1 of a porous membrane is sufficiently smaller than the particle size of suspended particles. As the porosity A1 of the treated water side surface layer is large and preferably the number of pore spans between branch points is small, even in case where the filtration amount of water per unit membrane area (filtration flux) is increased, it is thought that the local flux generated in the surface layer pores becomes lower and more uniform (compared with a membrane having a lower value of A1). As a result, the force of pressing the suspended particles to the membrane surface is reduced, and if aeration is further performed on the treated water-side surface, the increase in concentration of the suspended substance on the membrane surface is suppressed because the flowability of the suspended particles increases, so that the increase with time of the filtration pressure is suppressed, and continuation of stable filtration becomes possible over a long period of time.

The filtration by the porous membrane of the present invention may preferably be carried out by using, e.g., a membrane module which containing the porous membrane. Examples of such a membrane module suitable for carrying out aeration of the treated water-side surface of a porous membrane, my include those disclosed by WO2007/080910A1 or WO2007/040035A1.

As for the timing of aeration, in case where the filtration is performed by using a membrane module dipped in a vessel exposed to the atmosphere, it is preferred to perform the aeration simultaneously with the filtration. It is also preferred to place a pause of only filtration intermittently, while performing aeration continuously. In this case, after performing filtration continuously for 3 minutes to 30 minute, preferably 5 minutes to 15 minutes, a filtration pause is placed for 30 seconds to 5 minutes, preferably for 1 minute to 2 minutes. It is preferred to repeat filtration and a filtration pause periodically by such time distribution. Such a method of performing aeration onto a membrane surface under use for filtration is suitable for a case, where the concentration of suspended particles is high in terms of MLSS (mixed liquor suspended solid weight) being about 3000-20000 mg/L as in the MBR process.

The aeration rate may be 5-200-$m^3$/h, preferably 10-100 $m^3$/h, still more preferably 20-70 $m^3$/h, per 1 $m^2$ of bottom area of the membrane module. Less than 5-$m^3$/h is not enough for suppression of the filtration pressure rise, and the effect of suppressing the filtration pressure rise is saturated in excess of 200 $m^3$/h.

In case where the filtration is performed by introducing water to be treated into a closed membrane module obtained by confining a membrane in a casing, it is difficult from a structural limitation of the module to perform the filtration and aeration simultaneously, so that it is preferred to perform the filtration and aeration alternately. In the case of alternation, the filtration may be performed continuously for 5 minutes to 5 hours, preferably 30 minutes to 3 hours, and then the filtration may be stopped to perform aeration for 10 seconds to 5 minutes, preferably for 30 seconds to 3 minutes. It is preferred to repeat filtration and aeration periodically by such time distribution.

The aeration rate may be 20-400 $m^3$/h, preferably 50-300 $m^3$/h, per 1 $m^2$ of bottom area of the membrane module. Less than 20 $m^3$/h is not enough for suppression of the filtration pressure rise, and the effect of suppressing the filtration pressure rise is saturated in excess of 400 $m^3$/h.

The present invention further includes a process for producing filtrated water, comprising: filtrating water to be treated through a vinylidene fluoride resin porous membrane obtained in the above-described manner, and a step of injecting a chemical liquid from a filtrated water side of the vinylidene fluoride resin porous membrane to wash the membrane.

In the above-mentioned process for producing filtration water, the injection of the chemical liquid from the filtration water side surface, or a reverse pressure injection from the hollow part in the case of a hollow-fiber membrane, may preferably be performed while the membrane is attached to the filtration apparatus (the CIP (Clean In Place) process).

It is also preferred to perform the chemical liquid injection while retaining the membrane held in the filtration apparatus and immersed in the water to be filtrated, preferably by performing aeration simultaneously or alternately with the filtration, and it becomes possible to perform CIP efficiently. This is because the chemical liquid injection in the CIP process principally aims at removing the soil attaching to the inside of the membrane including the surface layer, and if the aeration is performed in combination to remove the soil on the surface, it becomes possible to improve the membrane cleaning in a comprehensive manner and maintain a long term of continual operation.

As chemical liquids, it is preferred to use aqueous solutions of, e.g., oxidizing agents, such as sodium hypochlorite and hydrogen peroxide, acids, such as hydrochloric acid and citric acid, and alkalis, such as sodium hydroxide.

As for the concentration of the chemical liquid, sodium hypochlorite may preferably be used at 0.02-1 wt. % in terms of an effective chlorine concentration; citric acid, 0.5-2 wt. %; and sodium hydroxide, 1-5 wt. %.

The membrane washing by injection of a chemical liquid may preferably performed, when the filtration pressure rises to 60 kPa or more in the case of immersion filtration, and to 150 kPa or more in the case of pressure filtration, More specifically, it may be performed once in two weeks-six months, preferably in one month-three months.

In the CIP process, the increase in frequency of membrane washing does not lead to a substantial increase in running cost, so that it is also preferred to perform the chemical liquid injection, as a precautionary measure before the filtration difference pressure rises notably. More specifically, it may be performed once in one day-one month, preferably once in three days-three months.

The injection flux of the chemical liquid may sufficiently be from an equivalent rate as to about several times the filtration flux and, more specifically, about 0.3-10 m/day on the basis of a treated water-side surface area. Since the CIP process removes a membranous soil by the chemical decomposition or solvent action by the chemical liquid, it is only required that the chemical liquid contacts a membrane efficiently. For this reason, after a chemical liquid contacts a membrane, it is also preferred to effect the process of injecting at as low a flux as possible and, more specifically, to inject at a rate of 0.1-2 m/day, or stop the injection at a point of time when the chemical liquid contacts a membrane and retains the state for a definite period.

The contact time of the membrane and the chemical liquid may be 2-240 minutes, preferably 3 to 100 minutes, still more preferably 5 to 30 minutes in terms of the total of the injection time and retention time for one time of chemical liquid injection.

EXAMPLES

Hereinbelow, the present invention will be described more specifically based on Examples and Comparative Examples. The properties described herein including those described below and except for the values measured according to the above-mentioned FIB-SEM method, are based on measured values according to the following methods.

(Crystalline Melting Points Tm1, Tm2, and Crystallization Temperatures Tc, Tc')

A differential scanning calorimeter "DSC-7" (made by Perkin-Elmer Corp.) was used. A sample resin of 10 mg was set in a measurement cell, and in a nitrogen gas atmosphere, once heated from 30° C. up to 250° C. at a temperature-raising rate of 10° C./min., then held at 250° C. for 1 min. and cooled from 250° C. down to 30° C. at a temperature-lowering rate of 10° C./min., thereby to obtain a DSC curve. On the DSC curve, an endothermic peak temperature in the course of heating was determined as a melting point Tm1 (° C.), and a heat of absorption by the endothermic peak giving Tm1 was measured as a crystal melting enthalpy. Further, an exothermic peak temperature in the course of cooling was determined as a crystallization temperature Tc (° C.). Successively thereafter, the sample resin was held at 30° C. for 1 min., and re-heated from 30° C. up to 250° C. at a temperature-raising rate of 10° C./min. to obtain a DSC curve. An endothermic peak temperature on the re-heating DSC curve was determined as an inherent melting point Tm2 (° C.) defining the crystallinity of vinylidene fluoride resin in the present invention.

Further, for the measurement of a crystallization temperature Tc' (° C.) of a mixture of a vinylidene fluoride resin and a plasticizer etc., as a film starting material, a sample comprising 10 mg of a first intermediate form obtained by melt-kneading through an extruder and extruded out of a nozzle, followed by cooling and solidification, was subjected to a temperature raising and lowering cycle identical to the one described above to obtain a DSC curve, on which an exothermic temperature in the course of cooling was detected as a crystallization temperature Tc' (° C.) of the mixture.

(Mutual Solubility)

A mutual solubility of a polyester plasticizer, a monomeric ester plasticizer, or a mixture of these (which are each referred to in this section as simply "plasticizer") with vinylidene fluoride resin was evaluated in the following manner:

23.73 g of vinylidene fluoride resin and 46.27 g of a plasticizer are mixed at a room temperature, to obtain a slurry mixture. Then, a barrel of a mixer ("LABO-PLASTOMILL" Mixer Type "R-60", made by Toyo Seiki K.K.) is set to a prescribed temperature which is higher than the melting point of the vinylidene fluoride resin by 10° C. or more (e.g., by 17-37° C.), and the above slurry mixture is fed to the mixer and melt-kneaded therein at mixer rotation speed of 50 rpm. In case where the mixture becomes clear (to such an extent that it does not leave a material giving turbidity recognizable with naked eyes) within 10 minutes, the plasticizer is judged to be mutually soluble with the vinylidene fluoride resin. In some cases, the melt-kneaded mixture can be viewed opaque due to entanglement of bubbles, e.g., because of a high viscosity of the melt-kneaded mixture. In such a case, the judgment should be made after evacuation as by heat pressing, as required. In case where the mixture is solidified by cooling, the mixture is heated again into a melted state to effect the judgment.

(Weight-Average Molecular Weight (Mw))

A GPC apparatus ("GPC-900", made by Nippon Bunko K.K.) was used together with a column of "Shodex KD-806M" and a pre-column of "Shodex KD-G" (respectively made by Showa Denko K.K.), and measurement according to GPC (gel permeation chromatography) was performed by using NMP as the solvent at a flow rate of 10 ml/min. at a temperature of 40° C. to measure polystyrene-based molecular weights.

(Whole Layer Porosity A2)

An apparent volume V ($cm^3$) of a porous membrane (either a planar membrane or a hollow-fiber membrane) was calculated, and also a weight W (g) of the porous membrane was measured, to determine the whole layer porosity A2 from the following formula:

$$\text{Whole layer porosity } A2(\%) = (1 - W/(V \times \rho)) \times 100 \quad \text{[Formula 1]}$$

$\rho$: Specific gravity of PVDF (=1.78 $g/cm^3$).

Incidentally, a ratio A0/RB between a non-stretched whole layer porosity A0 measured in a similar manner as above with respect to a membrane after extraction but before stretching and a proportion RB (wt. %) of a mixture B of a plasticizer (and a solvent, if any) in the melt-extruded composition, is taken to roughly represent a pore-forming efficiency of the mixture B.

(Average Pore Size)

An average pore size Pm ($\mu m$) was measured according to the half dry method based on ASTM F316-86 and ASTM E1294-89 by using "PERMPOROMETER CFP-2000AEX" made by Porous Materials, Inc. A perfluoropolyester (trade name "Galwick") was used as the test liquid.

(Maximum Pore Size)

A maximum pore size Pmax ($\mu m$) was measured according to the bubble-point method based on ASTM F316-86 and ASTM E1294-89 by using "PERMPOROMETER CFP-2000AEX" made by Porous Materials, Inc. A perfluoropolyester (trade name "Galwick") was used as the test liquid.

(Surface Pore Size P1 on the Side of Water-to-be-Treated and Surface Pore Size P2 on the Permeated Water Side)

A porous-membrane sample (of either planar or t hollow-fiber form) was subjected to measurement of an average pore size P1 on the water-to-be-treated side surface (an outer surface with respect to a hollow fiber) and an average pore size P2 on the permeated water side surface (an inner surface with respect to a hollow fiber) by the SEM method (SEM average pore size). Hereafter, a measurement method is described with respect to a hollow-fiber porous-membrane sample for an example. About the outer surface and inner surface of a hollow-fiber membrane sample, SEM-photographs are respectively taken at an observation magnification of 15,000 times. Next, each SEM photograph is subjected to measurement of pore sizes with respect to all recognizable pores. A major axis and a minor axis are measured for each pore, and each pore size is calculated according to a formula of: pore size=(major-axis+minor axis)/2. An arithmetic mean of all the measured pore size, is take to determine an outer surface average pore size P1 and an inner-surface average pore size P2, respectively. Incidentally, in case where too many pores are observed in a taken photographic image, it is possible to divide the photographic image into four equal areas and performing the above-mentioned pore size measurement with respect to one area (¼ picture). In the case where the pore size measurement is performed based on a ¼ picture with respect to an outer surface of the hollow-fiber membrane of the present invention, the number of examined pores will be roughly about 200 to 300.

(Water Permeability)

Figure 1:
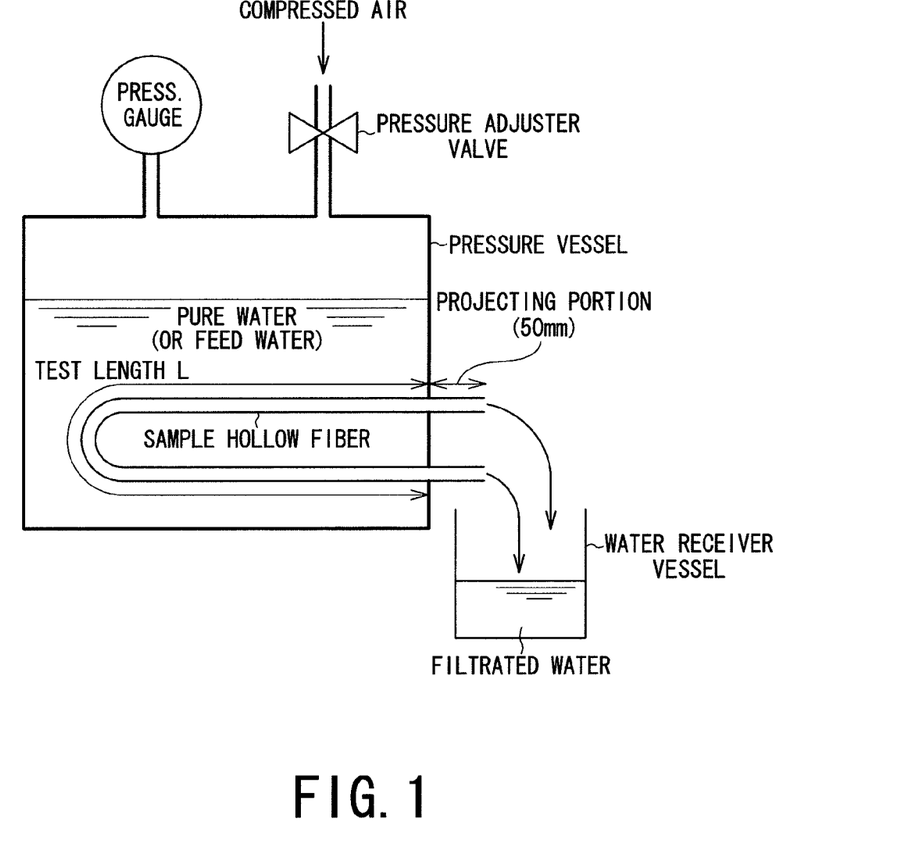
FIG. 1 is a schematic illustration of an apparatus for evaluating water permeability of hollow-fiber porous membranes obtained in Examples and Comparative Examples.

A sample hollow-fiber porous membrane having a test length L (as shown in FIG. 1)=200 mm was immersed in ethanol for 15 min., then immersed in water to be hydrophilized, and then subjected to a measurement of water permeation rate per day ($m^3$/day) at a water temperature of 25° C. and a pressure difference of 100 kPa, which was then divided by a membrane area of the hollow-fiber porous membrane ($m^2$) (=Outer diameter×π×test length L) to provide a water permeation rate. The resultant value is indicated, e.g., as F (100 kPa, L=200 mm), in the unit of m/day (=m$^3$/m$^2$·day).

(CIP Recovery Time (MBR Process-CIP Process))

Figure 2:
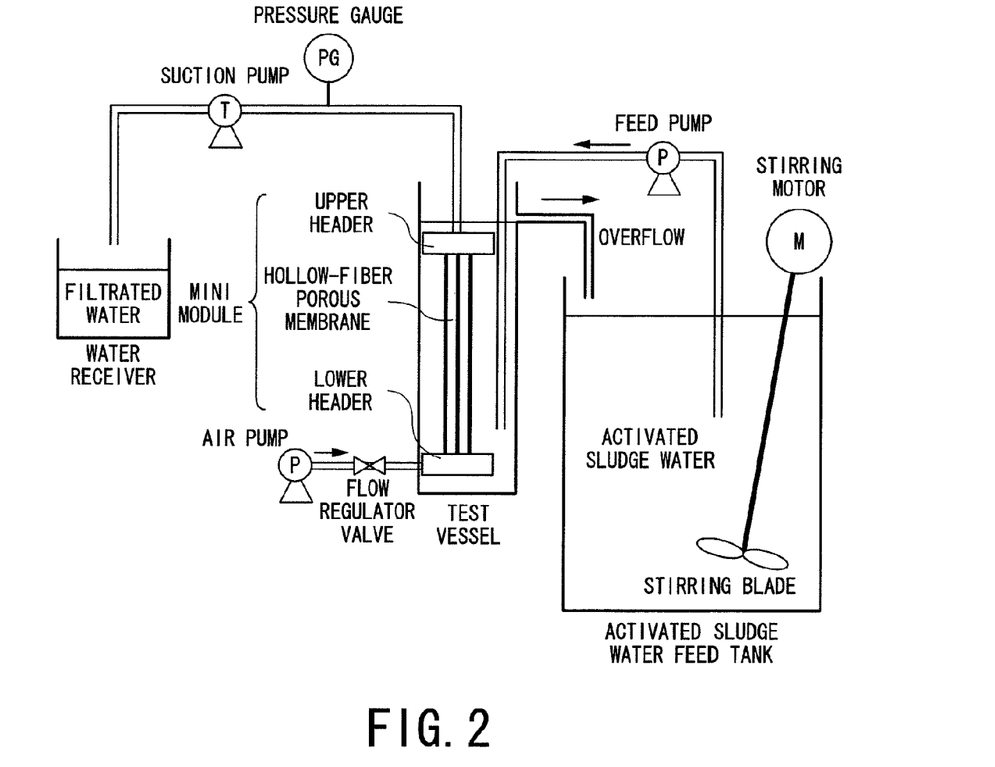
FIG. 2 is a schematic illustration of an apparatus for evaluating of hollow-fiber porous membranes obtained in Examples and Comparative Examples by the MBR process (and the CIP process).

In a test apparatus as shown in FIG. 2, an immersion-type mini-module formed from a hollow-fiber porous-membrane sample is subjected to continuous filtration of activated sludge water at a filtration flux of 1.7 m/day and then to a reverse washing with a chemical liquid (CIP process), thereby measuring a CIP recovery time which is defined as a time period required until the pressure difference between the outside and inside of the hollow-fiber porous membrane is recovered to the value immediately after the start of the filtration (initial value).

The mini module is formed by fixing three hollow-fiber porous-membrane samples vertically so as to provide an effective filtration length per fiber of 500 mm between an upper header and a lower header. The upper header is equipped with upper insertion slots for fixing open upper ends of hollow-fiber membranes at a lower part thereof, an internal space (flow path) for filtrated water communicative with the upper insertion slots, and a filtrated water exit for discharging the filtrated water at an upper part thereof. The lower header has lower insertion slots for fixing closed lower ends of the hollow-fiber membranes at an upper part thereof, 10 aeration nozzles of 1 mm in diameter not communicative with the lower insertion slots, an internal space (supply path) for supplying air to the aeration nozzles, and an air supply port for supplying air to the internal space. The upper and lower ends of the three hollow-fiber membrane samples are inserted into the upper slots and lower slots, respectively, and fixed liquid-tight with the upper header and in a closed state with the lower header, respectively with an epoxy resin.

The module-forming hollow-fiber membrane samples are immersed in ethanol for 15 minutes and rinsed with water to be wetted, and then immersed vertically at an almost central part within a rectangular test water vessel measuring a bottom area of about 30 cm$^2$ and retaining a water level of 600 mm. On the other hand, to the test water vessel, an activated sludge water or slurry containing MLSS (mixed liquor suspended solids) of 8600 mg/L and a dissolved organic content DOC (measured as a TOC (total organic content) after filtration with 1-μm glass filter) of 7-9 mg/L accommodated in a feed water tank with an internal volume of 20 L, is supplied at a rate of 0.2 L/with a pump, and an overflow is circulated back to the feed water tank. Further, from the lower header, air is supplied at a rate of 5 L/min. to cause continual bubbling in the activated sludge water in the test vessel.

In this state, a suction pump is operated to suck from the filtration water exit of the upper header to effect a cycle including 13 minute of a suction filtration operation for 13 minutes from the exterior to the inside of the hollow-fiber membranes at a fixed filtration flux of 1.7 m/day and 2 minute of a pause period, thereby performing 24 hours of filtration operation to measure changes in pressure difference between the outside and the inside of the hollow-fiber membranes. An average pressure difference during first 5 minutes after the start of the filtration is recoded as an initial pressure difference TMP1, and an average pressure difference during first 5 minutes after the 24 hours of the filtration is recoded as a terminal pressure difference TMP2.

Next, a chemical liquid container filled with a sodium hypochlorite aqueous solution (at an effective chlorine concentration of 3000 ppm) is attached in place of the water receiver, and the suction pump is reversed in direction of suction and operated to inject the sodium hypochlorite aqueous solution from the filtrated water outlet of the upper header, similarly at a filtration flux of 1.7 m/day from the inside to the outside of the hollow-fiber porous membranes, thereby recording changes in difference pressure (back wash difference pressure) between the inside and outside of the hollow-fiber porous membrane and measuring a time t until the back wash difference pressure falls gradually and reaches an equilibrium value with advance of the membranous washing.

Next, the water receiver is attached in place of the, and the suction pump is reversed to the original suction direction and operated to effect water filtration, similarly at a filtration flux of 1.7 m/day from the outside to the inside of the hollow-fiber porous membranes, thereby recording changes in difference pressure (filtration pressure difference) between the outside and inside of the hollow-fiber porous membrane and recording an average of pressure difference during first 5 minutes after the resumption of filtration as a pressure difference after recovery: TMP3. In this instance, if a pressure difference recovery rate calculated according to the following formula is 0.95 or more, the time t is recoded as a CIP recovery time:

$$\text{Pressure difference recovery rate}=(TMP2-TMP3)/(TMP2-TMP1).$$

In case where the difference pressure recovery rate is less than 0.95, the injection of sodium hypochlorite aqueous solution is performed for further 10 minutes, and the suction filtration is carried out again to measure TMP3. This operation is repeated until the pressure difference recovery rate reaches 0.95 or more, and this additional chemical liquid injection time is added to the time to calculate a total chemical liquid injection time as a CIP recovery time.

(SEM Observation of Membrane Surface Deposit (Cake))

After the 24 hours of suction filtration in the above-mentioned measurement of CIP recovery time, one of the three hollow-fiber porous-membrane samples surface-flushed with pure water and dried for 24 hours in a vacuum dryer. The outer surface of the membrane was then observed through a scanning electron microscope at a magnification of 5000 times to observe the presence or absence of membrane surface deposit (cake).

(Surface Tension Measurement)

A surface tension of a wetting promoter liquid was measured by using a Du Nouy surface tension meter by the ring method according to JIS-K3362.

(Tensile Test)

A tensile tester ("RTM-100", made by Toyo Baldwin K.K.) was used for measurement in the atmosphere of a temperature of 23 and 50% of relative humidity, under the conditions including an initial sample length of 100 mm and a crosshead speed of 200 mm/min.

Example 1

A matrix vinylidene fluoride resin (PVDF-I) (powder) having a weight-average molecular weight (Mw) of $4.1 \times 10^5$ and a crystallinity modifier vinylidene fluoride resin (PVDF-II) (powder) having Mw=$9.7 \times 10^5$ were blended in proportions of 75 wt. % and 25 wt. %, respectively, by a Henschel mixer to obtain a PVDF mixture having Mw=$5.4 \times 10^5$ (Mixture A, crystallization temperature after being formed into a membrane=150.4° C.).

As a plasticizer, an adipic acid-based polyester plasticizer (polyester of adipic acid and 1,2-butanediol having a terminal capped with isononyl alcohol, "D623N" made by J-PLUS Co. Ltd.; number-average molecular weight=about 1800), a viscosity at 25 of 3000 mPa-s as measured by a cone-plate rotational viscometer according to JIS K7117-2) and a monomeric ester plasticizer ("DINA" made by J-PLUS Co. Ltd.)

were mixed in a ratio of 88 wt. %/12 wt. % under stirring at room temperature to obtain a plasticizer mixture (Mixture B).

An equi-directional rotation and engagement-type twin-screw extruder ("TEM-26SS", made by Toshiba Kikai K.K.; screw diameter: 26 mm, L/D=60) was used, and Mixture A was supplied from a powder supply port to be melt-kneaded at a barrel temperature of 220° C., Mixture B was supplied at a Mixture A/Mixture B ratio of 27.9 wt. %/72.1 wt. % from a liquid supply port downstream of the powder supply port to melt-kneaded at a barrel temperature of 220° C., and the melt-kneaded product was extruded through a nozzle (at 190° C.) having an annular slit of 6 mm in outer diameter and 4 mm in inner diameter into a hollow fiber-form extrudate. In this instance, air was injected into a hollow part of the fiber through an air supply port provided at a center of the nozzle so as to adjust an inner diameter of the extrudate.

The extruded mixture in a molten state was introduced into a cooling bath of water maintained at 50° C. and having a surface 280 mm distant from the nozzle (i.e., an air gap of 280 mm, Tq=50° C.) to be cooled and solidified (at a residence time in the cooling bath of about 6 sec.), pulled up at a take-up speed of 5.0 m/min. and wound up about a bobbin to obtain a first intermediate form.

Then, the first intermediate form was immersed in dichloromethane at room temperature for 30 min. to extract the plasticizer, while rotating the bobbin so as to impregnate the fiber evenly with dichloromethane. Then, the extraction was repeated under the same condition by replacing the dichloromethane with a fresh one to effect totally 4 times of extraction.

Next, the first intermediate form was heat-treated in an oven at a temperature of 120° C. for 1 hour to remove the dichloromethane and obtain a second intermediate form, while allowing the bobbin to contract freely in diameter so as to relax the contraction stress on the fiber.

Next, the second intermediate form wound about the bobbin was immersed in an emulsified aqueous solution (surface tension=32.4 mN/m) obtained by dissolving polyglycerin fatty acid ester ("SY Glister ML-310" made by Sakamoto Yakuhin Kogyo Co., Ltd.; HLB=10.3), as a surfactant, at a concentration of 0.05 wt. % in pure water where, for 30 minutes at room temperature.

Then, while the bobbin was still immersed in the emulsified aqueous solution and rotated, the second intermediate form was longitudinally stretched at a ratio of 1.75 times by passing it on a first roller at a speed of 20.0 m/min., through a water bath at 60° C. and on a second roller at a speed of 35.0 m/min. Then, the intermediate form was caused to pass through a bath of warm water controlled at 90° C. and through a dry heating bath controlled at a spatial temperature of 140° C. to effect a heat treatment, and then taken up to provide a polyvinylidene fluoride-based hollow-fiber porous membrane (a third form) according to the process of the present invention. It took about 200 minutes until completing the stretching of the second intermediate form wound about the bobbin was completed.

Comparative Example 1

A hollow-fiber porous membrane was prepared in the same manner as in Example 1 except that the mixing ratio of PVDF-I and PVDF-II was changed to 95 wt. % and 5 wt. %, respectively, to obtain PVDF-mixture A; Mixture B was changed to a mixture of an adipic acid-based polyester plasticizer (a polyester of adipic acid octyl alcohol and 1,2-propylene glycol having a terminal capped with octyl alcohol, "PN150" made by K.K. ADEKA; number-average molecular weight=about 1000, viscosity=500 mPa-s) and N-methylpyrrolidone (NMP) at a ratio of 82.5 wt. %/17.5 wt. %, mixed by stirring at room temperature; Mixture A and Mixture B were supplied at a ratio of 38.4 wt. %/61.6 wt. %; the cooling water bath temperature was changed to 40; the stretching ratio was changed to 1.85 times; and the heat treatment after stretching was changed to relaxation of 8% in a water bath at 90 and then relaxation of 3% in air at 140

Comparative Example 2

Physical property measurement was performed with respect to a commercially available hollow-fiber porous membrane of vinylidene fluoride resin ("STERAPORE", made by Mitsubishi Rayon Co., Ltd.) assumed to have been manufactured by the process of Patent document 2. The surface of the hollow-fiber porous-membrane exhibited a silicon content of 1.3 wt. % (2.8 wt. % as $SiO_2$) according to XPS (X-ray photoelectron spectroscopy). Such content of silicon is not substantially observed in the hollow-fiber porous-membrane of the present invention.

The production conditions and the physical properties of the resultant hollow-fiber porous membranes of the above-described Example and Comparative Examples, are inclusively shown in the following Table 1. Incidentally, the hollow-fiber porous membrane of Comparative Example 2 has a composite structure formed by coating a core layer of plain-weave braid made of polyester multi-filaments with an outer layer of polyvinylidene fluoride as disclosed in Examples of Patent document 2, so that the whole layer porosity A2 thereof was measured with respect to the outer layer. Moreover, FIGS. 3-5 attached hereto show a SEM picture (10000 times) after binary image processing of a view field (10 μm×10 μm) (observed surface obtained by renewing the surface down to 1 μm-depth of totally examined 2 μm-thickness) at an intermediate part of the hollow-fiber porous membrane of each Example. In each of FIGS. 3-5, the left-hand side is directed to an outer surface side, a white part shows resin fiber (phase) and a black part shows a pore (phase), respectively. Compared with FIG. 4 (Comparative Example 1) and FIG. 5 (Comparative Example 2), a network resin fiber texture composed of fiber with a much smaller diameter and much higher homogeneity is recognized in FIG. 3 (Example).

TABLE 1

|  | Item | Unit | Example 1 | Comparative Example 1 | Comparative Example 2 |
|---|---|---|---|---|---|
| Mixture A | Mw of matrix PVDF (I) ×$10^5$ |  | 4.1 | 4.1 |  |
|  | Mw of crystallinity modifier PVDF (II) ×$10^5$ |  | 9.7 | 9.7 |  |
|  | Content of PVDF (I) in Mixture A | Wt. % | 75 | 95 |  |
|  | Content of PVDF (II) in Mixture A | Wt. % | 25 | 5 |  |
|  | Mw of Mixture A ×$10^5$ |  | 5.4 | 4.4 |  |

TABLE 1-continued

| | Item | Unit | Example 1 | Comparative Example 1 | Comparative Example 2 |
|---|---|---|---|---|---|
| Mixture B | Polyester plasticizer species | | D623N | PN-150 | |
| | Polyester plasticizer molecular weight | | About 1800 | About 1000 | |
| | Monomeric ester plasticizer species | | DINA | | |
| | Solvent species | | | NMP | |
| | Content of Polyester plasticizer in Mixture B | Wt. % | 88 | 82.5 | |
| | Content of Monomeric ester plasticizer in Mixture B | Wt. % | 12 | | |
| | Content of solvent in Mixture B | Wt. % | | 17.5 | |
| Extrusion supply ratio | Supply ratio of Mixture A:RA | Wt. % | 27.9 | 38.4 | |
| | Supply ratio of Mixture B:RB | Wt. % | 72.1 | 61.6 | |
| Overall composition | PVDF | Wt. % | 27.9 | 38.4 | |
| | Polyester plasticizer | Wt. % | 63.4 | 50.8 | |
| | Monomeric ester plasticizer | Wt. % | 8.7 | 0.0 | |
| | Solvent | Wt. % | 0.0 | 10.8 | |
| | Crystallization temperature Tc' of the composition | ° C. | 147.2 | 138.7 | |
| Production conditions | Die temperature Td | ° C. | 210 | 150 | |
| | Water bath temperature Tq | ° C. | 50 | 40 | |
| | Tc' – Tq | ° C. | 97.2 | 88.7 | |
| | Td – Tq | ° C. | 160 | 110 | |
| | Td – Tc' | ° C. | 62.8 | 11.3 | |
| | Take-up speed | m/min | 5 | 9.2 | |
| | Whole layer porosity A0 before stretching | % | 71 | 64 | |
| | Stretching temperature | ° C. | 60 | 60 | |
| | Stretching ratio | Times | 1.75 | 1.85 | |
| | First-stage relaxation conditions | | Wet 90° C. | Wet 90° C. | |
| | First-stage relaxation rate | % | 0 | 8 | |
| | Second-stage relaxation conditions | | Dry 80° C. | Dry 140° C. | |
| | Second-stage relaxation rate | % | 0 | 3 | |
| Physical properties | Outer diameter | mm | 1.52 | 1.37 | 2.70 |
| | Inner diameter | mm | 0.98 | 0.87 | 0.75 |
| | Film thickness | mm | 0.27 | 0.25 | 0.98 |
| | Surface layer thickness | um | 45 | 9 | 3 |
| | Whole layer porosity A2 | % | 81 | 72 | 82* |
| | Treated water-side surface pore size P1 | um | 0.15 | 0.14 | 0.21 |
| | Average pore size (Half-dry-method) | um | 0.08 | 0.10 | 0.12 |
| | Maximum pore size (Bubble-point-method) | um | 0.22 | 0.20 | 0.30 |
| | Pure water permeability (100 kPa, 25° C., L = 200 mm) | m³/m²/day | 21.2 | 32.0 | 183.0 |
| | Tensile strength at break | MPa | 7.6 | 10.5 | |
| | Elongation at break | % | 196 | 93 | |
| | Tc | ° C. | 150.4 | 146.7 | |
| | Tc – Tc' | ° C. | 3.2 | 8.0 | |
| | Pore formation efficiency A0/RB | | 1.0 | 1.0 | |
| Textural parameters of Treated water-side surface layer | Observation depth | um | 10 | 10 | 10 |
| | Total observed volume V | ×10¹¹ nm³ | 2.0 | 2.0 | 2.0 |
| | Total fiber volume Vt | ×10¹¹ nm³ | 4.7 | 9.7 | 9.1 |
| | Total void volume Vp | ×10¹¹ nm³ | 1.5 | 1.0 | 1.1 |
| | Surface layer porosity A1 | % | 77 | 52 | 55 |
| | Fiber average diameter | nm | 81 | 140 | 140 |
| | Number of pore spans between branch points | — | 3928 | 6180 | 8940 |
| | Number of pore spans between branch points in 1 um³ | —/um³ | 19.6 | 30.9 | 44.7 |
| | A1/A2 | | 0.94 | 0.72 | 0.67* |
| | A1/P1 | | 527.59 | 367.86 | 259.52 |
| Filtration performances | Cake deposition | | None | Present | Present |
| | CIP recovery time | minutes | 5 | 40 | 50 |

*The whole layer porosity A2 of Comparative Example 2 is the measured value (%) about the outer layer.

In addition, the hollow-fiber porous membrane obtained in each Example was subjected to the above-mentioned MBR process and CIP recovery process. As a result, the following results were obtained.

Example 1

The outer surface of the membrane after the 24-hour filtration according to the MBR process was observed through a SEM (5000 times), whereby open pores were observed on the entire surface and no cake was observed.

When the membrane after the MBR process was subjected to the CIP processing, the reverse washing pressure difference reached 5 minutes after the start of the processing, and then suction filtration was resumed again to show a pressure difference recovery rate of 0.98 so that the CIP recovery time was determined to be 5 minutes.

Comparative Example 1

The outer surface of the membrane after the 24-hour filtration according to the MBR process was observed, whereby cake was observed at about 70% of the outer surface and open pores were observed only partially on the surface. When the membrane after the filtration was subjected to the CIP processing, the reverse washing pressure difference reached 30 minutes after the start of the processing, and then suction filtration was resumed again to show a pressure difference recovery rate of 0.98 so that the CIP recovery time was determined to be 40 minutes.

Comparative Example 2

The outer surface of the membrane after the 24-hour filtration according to the MBR process was observed, whereby cake was observed over the entire surface and substantially no open pores were observed on the surface. When the membrane after the filtration was subjected to the CIP processing, the reverse washing pressure difference reached 50 minutes after the start of the processing, and then suction filtration was resumed again to show a pressure difference recovery rate of 1.00 so that the CIP recovery time was determined to be 50 minutes.

INDUSTRIAL APPLICABILITY

As is understood from the above-mentioned evaluation results of Example and Comparative Examples including those shown in FIGS. 3-5 and Table 1, according to the present invention, there are provided a vinylidene fluoride resin porous membrane having a treated water side surface layer which shows a small surface pore size suitable for water filtration treatment also comprises extremely thin network resin fibers giving an extremely high porosity, thus showing an excellent minute particle-blocking performance and also extremely good anti-soiling resistance and regeneratability, a process for producing the porous membrane, and a process for producing filtrated water using the porous membrane according to the MBR process and/or the CIP process. Although the vinylidene-fluoride-resin porous membrane of the present invention is suitable for water (filtration) treatment as mentioned above, it also has characteristics that the pore sizes are continually expanded in the direction of the membrane thickness and the porosity is uniformly distributed in the direction of the membrane thickness. Particularly, owing to the improvement in porosity of the dense layer which contributes to separation characteristic and selective permeation characteristic, the membrane provides little resistance to movement or permeation of fluid or ions, while having excellent separation or selective permeation characteristics. Accordingly, the porous membrane of the present invention can be suitably used not only for water (filtration) treatment but also as separation membranes for condensation of bacteria, protein, etc., and for recovery of the chemically flocculated particles of heavy metals, separation membranes for oil-water separation or gas-liquid separation, a separator membrane for lithium ion secondary batteries, a support membrane for solid electrolyte, etc.

The invention claimed is:

1. A process for producing a porous membrane including a 10 μm-thick portion contiguous to one surface thereof which comprises network resin fibers having an average diameter of at most 100 nm and shows a posority A1 of at least 60% as measured by a focused ion beam-scanning electron microscope, and showing a surface pore size of at most 0.3 μm on said one surface thereof, comprising: melt-extruding a composition obtained by melt-kneading 20-50 wt. % of a vinylidene fluoride resin having a weight-average molecular weight of at least 300,000 and 50-80 wt. % of a plasticizer into a form of a film; cooling the film preferentially from one surface thereof with a liquid inert to the vinylidene fluoride resin to solidify the film; and extracting the plasticizer to recover a porous membrane having an asymmetrical gradient-network-texture; wherein the plasticizer comprises a polyester plasticizer which is mutually soluble with the vinylidene fluoride resin at a temperature forming the melt-kneaded composition and provides the melt-kneaded composition with a crystallization temperature which is substantially identical to crystallization temperature of the vinylidene fluoride resin alone, and stretching the porous membrane after the extraction while selectively wetting the porous membrane to a depth which is at least 5 μm and at most ½ of the membrane thickness from said one surface of the membrane.

2. A production process according to claim 1, wherein the composition having a crystallization temperature Tc' is melt-extruded at a temperature Td and cooled in a water bath at a temperature Tq so as to satisfy relationships of Td−Tc'≥30° C. and Tc'−Tq≥60° C.

3. A production process according to claim 1, wherein said plasticizer comprises a polyester plasticizer having a number-average molecular weight of at least 1200 and a mutual solubility inhibitor with the vinylidene fluoride resin.

4. A production process given in claim 3, wherein said plasticizer comprises 50-98 wt. % of the polyester plasticizer and 2-50 wt. % of a monomeric ester plasticizer as the mutual solubility inhibitor.

5. A production process according to claim 1, wherein said polyester plasticizer has a viscosity at 25° C. of at most 1000 mPa·s.

6. A production process according to claim 1, wherein said polyester plasticizer comprises a polyester between adipic acid and a glycol.

7. A production process according to claim 1, wherein said polyester plasticizer is a polyester having a molecular terminal capped with a monohydric alcohol having 9-18 carbon atoms.

8. A production process according to claim 1, wherein said vinylidene fluoride resin is a mixture of 25-98 wt. % of a matrix vinylidene fluoride resin (PVDF-I) having a weight-average molecular weight of 200,000-670,000 and 2-75 wt. % of a vinylidene fluoride resin (PVDF-II), as a crystallizability modifier, having a weight-average molecular weight which is at least 1.8 times that of PVDF-I and less than 1,200,000.

9. A production process according to claim 1, wherein said composition is melt-extruded into a form of a hollow-fiber film, which is then cooled preferentially from an outer surface side thereof with a liquid inert to the vinylidene fluoride resin to solidify the film.

10. A production process according to claim 1, wherein said composition comprising a vinylidene fluoride resin and a plasticizer shows a crystallization temperature Tc' (° C.) of at least 140° C. according to DSC measurement.

* * * * *